United States Patent
Ferreira et al.

(10) Patent No.: US 8,593,908 B2
(45) Date of Patent: Nov. 26, 2013

(54) METHOD FOR DETERMINING AN ECHO DISTANCE IN AN ACOUSTIC PULSE-ECHO RANGING SYSTEM

(75) Inventors: Edson Ferreira, Peterborough (CA); Jean-René Larocque, Peterborough (CA)

(73) Assignee: Siemens Aktiengesellschaft, Munich (DE)

(*) Notice: Subject to any disclaimer, the term of this patent is extended or adjusted under 35 U.S.C. 154(b) by 226 days.

(21) Appl. No.: 13/218,195

(22) Filed: Aug. 25, 2011

(65) Prior Publication Data

US 2012/0051185 A1  Mar. 1, 2012

(30) Foreign Application Priority Data

Aug. 25, 2010  (EP) .................................... 10174029

(51) Int. Cl.
  *G01S 7/54*  (2006.01)
  *G01S 15/00*  (2006.01)
(52) U.S. Cl.
  USPC ............... 367/100; 367/99; 367/92; 367/95; 367/127
(58) Field of Classification Search
  USPC .............................................. 367/100, 99, 95
  See application file for complete search history.

(56) References Cited

U.S. PATENT DOCUMENTS

| | | | | |
|---|---|---|---|---|
| 3,890,618 A | * | 6/1975 | Speiser .......................... 342/202 |
| 4,543,632 A | * | 9/1985 | Ergas et al. ..................... 702/17 |
| 4,809,249 A | * | 2/1989 | Barnes ............................ 367/100 |
| 4,933,915 A | * | 6/1990 | Bostrom ........................... 367/99 |
| 5,587,969 A | | 12/1996 | Kroemer et al. |
| 6,856,576 B2 | | 2/2005 | Preston |
| 7,334,470 B1 | | 2/2008 | Bartoli et al. |
| 7,729,204 B2 | * | 6/2010 | Peng et al. ..................... 367/127 |
| 2004/0240680 A1 | * | 12/2004 | Rui et al. ......................... 381/92 |
| 2005/0276163 A1 | * | 12/2005 | Moon et al. ..................... 367/92 |
| 2006/0036169 A1 | * | 2/2006 | Satoh ............................. 600/437 |
| 2009/0257311 A1 | | 10/2009 | Daigle |

FOREIGN PATENT DOCUMENTS

| EP | 1 628 119 | 2/2006 |
|---|---|---|
| EP | 2 110 648 | 10/2009 |

OTHER PUBLICATIONS

Barshan et al: "Fast processing techniques for accurate ultrasonic range measurements", Measurement Science and Technology, IOP, Bristol, GB, vol. 11, No. 1, Jan. 2000, pp. 45-50.

* cited by examiner

*Primary Examiner* — Isam Alsomiri
*Assistant Examiner* — Hovhannes Baghdasaryan
(74) *Attorney, Agent, or Firm* — Cozen O'Connor

(57) ABSTRACT

A method, which allows, in an acoustic pulse-echo ranging system, the direct use of a digitized raw echo signal for correlation-based echo distance estimation, where an acoustic pulse having a carrier frequency is transmitted, a digital expected echo shape is provided with a time resolution higher than the carrier frequency, an echo is received from the acoustic pulse, the received echo is sampled and digitized at a sampling frequency higher than the carrier frequency, correlation values are created from the digitized received echo and the digital expected echo shape, the correlation values are weighted by emphasizing stronger correlation values, and the echo distance is determined from the center of mass of the weighted values.

7 Claims, 3 Drawing Sheets

METHOD FOR DETERMINING AN ECHO DISTANCE IN AN ACOUSTIC PULSE-ECHO RANGING SYSTEM

BACKGROUND OF THE INVENTION

1. Field of the Invention

The present invention relates to signal processing and, more particularly, to a method for determining the echo distance in an acoustic pulse-echo ranging system.

2. Description of the Related Art

In level measurement applications, pulse-echo ranging systems, such as time-of-flight ranging systems, are commonly used for determining the distance to a target object (e.g., reflective surface of a material in a container) by measuring how long it takes to receive reflected pulses or echoes after transmission of a burst of energy pulses. Such devices typically use ultrasonic pulses or pulsed radar or microwave signals.

Generally, acoustic pulse-echo ranging systems include a transmitter for transmitting the energy pulses and a receiver for receiving the reflected energy pulses or echoes. Here, the transmitter and receiver may be combined in a single unit. An echo profile is generated from the received energy pulses by amplifying, filtering and envelope shaping, where at some point an analog-to-digital conversion is performed. Echo pulses are identified in the digital echo profile by a signal processor, and the distance or range of the target is calculated based on the transmit times of the transmitted energy pulses and the identified echo pulses. The calculated distance or range is then transmitted over a communication network to a process control system using a communications protocol, such as analog 4-20 mA, HART, PROFIBUS or FOUNDATION Fieldbus.

U.S. Pat. No. 7,334,470 to Bartoli et al. discloses an acoustic pulse-echo ranging system that has a fully digital receiver. Here, the raw echo data are digitized directly, i.e., without prior analog filtering, at high speed and then digitally processed to generate distance measurement. The digital processing comprises buffering, low pass filtering, bandpass filtering, envelope detecting, resampling, logarithmic amplifying, scaling and echo processing.

U.S. Pat. No. 6,856,576 to Preston discloses an echo processing method using autocorrelation. Here, the raw echo data are sampled, digitized and high-pass filtered. A correlation signal is created by adding the filtered signal to a copy of the filtered signal shifted by a time unit. A set of correlation signals is created by repeating the process for a range of time units corresponding to a set of sequential sample points. The correlation signal having the highest correlation strength is identified, and the time shift used to create it is identified as the time of flight of the echo pulse.

Raw echo data that are sampled and digitized at a high sampling frequency without prior analog filtering contains a maximum level of information, such as phase information and/or presence of multiple frequencies. This information, however, will be lost if the digitized raw data are filtered or smoothed during their further digital processing.

On the other hand, correlation of a high-resolution acoustic echo pulse comprising an amplitude modulated carrier with a similar wave form results in another amplitude modulated signal which is just as complex to evaluate. Thus, direct correlation will not help any further.

SUMMARY OF THE INVENTION

It is therefore an object of the invention to provide a method for determining an echo distance in an acoustic pulse-echo ranging system that solves the problems associated with conventional ranging systems.

This and other objects and advantages are achieved in accordance with the invention by a method in which an acoustic pulse having a carrier frequency is transmitted, a digital expected echo shape is provided with a time resolution higher than a carrier frequency, an echo is received from the transmitted acoustic pulse, the received echo is sampled and digitized at a sampling frequency higher than the carrier frequency, correlation values are created from the digitized received echo and the digital expected echo shape, the correlation values are weighted by emphasizing stronger correlation values, and the echo distance is determined from the center of mass of the weighted values.

Other objects and features of the present invention will become apparent from the following detailed description considered in conjunction with the accompanying drawings. It is to be understood, however, that the drawings are designed solely for purposes of illustration and not as a definition of the limits of the invention. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be now described in more detail with reference to preferred embodiments shown by way of non-limiting example in the attached drawings, in which.

DETAILED DESCRIPTION OF THE PRESENTLY PREFERRED EMBODIMENTS

Figure 1:
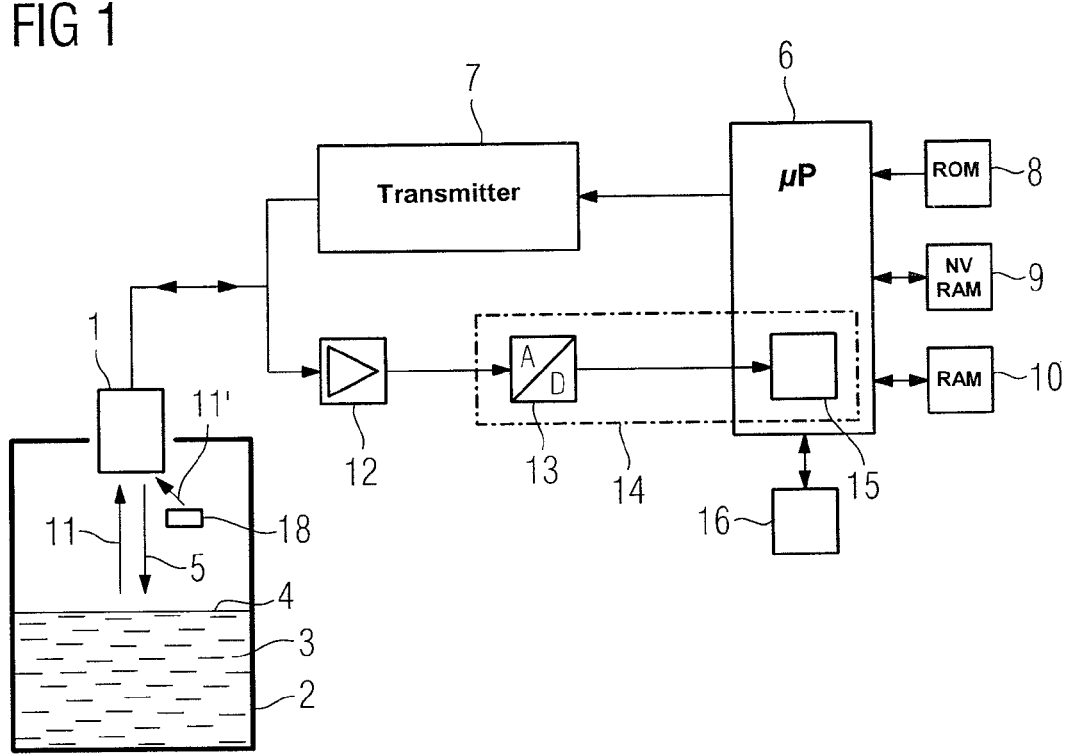
FIG. 1 is a schematic block diagram of an acoustic pulse-echo ranging system in which the method in accordance with an embodiment of the invention may be advantageously implemented.

With reference to FIG. 1, shown therein is an acoustic pulse-echo ranging system comprising an ultrasonic transducer 1 which is installed in a tank 2 containing a liquid 3, or other type of material, with a level determined by the top surface 4 of the liquid 3. The top surface 4 of the liquid 3 provides a reflective surface that reflects ultrasonic pulses 5 generated by the ultrasonic transducer 1.

The ultrasonic transducer 1 is coupled to a microprocessor 6 through a transmitter 7. The microprocessor 6 operates under a control program stored in read-only memory (ROM) 8, utilizing parameters stored in non-volatile random access memory (NVRAM) 9, and is provided with a working memory comprising random access memory (RAM) 10.

The microprocessor 6 controls the transmitter 7 to excite the ultrasonic transducer 1 to emit the ultrasonic pulses 5 at predetermined points in time, and with a predetermined frequency and amplitude. The reflected or echo pulse 11 is received by the ultrasonic transducer 1 and converted to an electric signal, which may be first amplified in an amplifier 12 before being sampled and digitized by an analog-to-digital converter 13. The analog-to-digital converter 13 is an input portion of a digital receiver 14 whose remaining portion is implemented in the microprocessor 6 as a software module 15. As described below, the microprocessor 6 executes an algorithm to determine the echo distance or time-of-flight and thus the level of the liquid 3 in the tank 2. An interface 16, controlled by the microprocessor 6, provides for the export of level-related data and the import of operating parameters. Data may be exported in the form of a display, telemetry (e.g., bus) signals and/or alarm signals.

Figure 2:
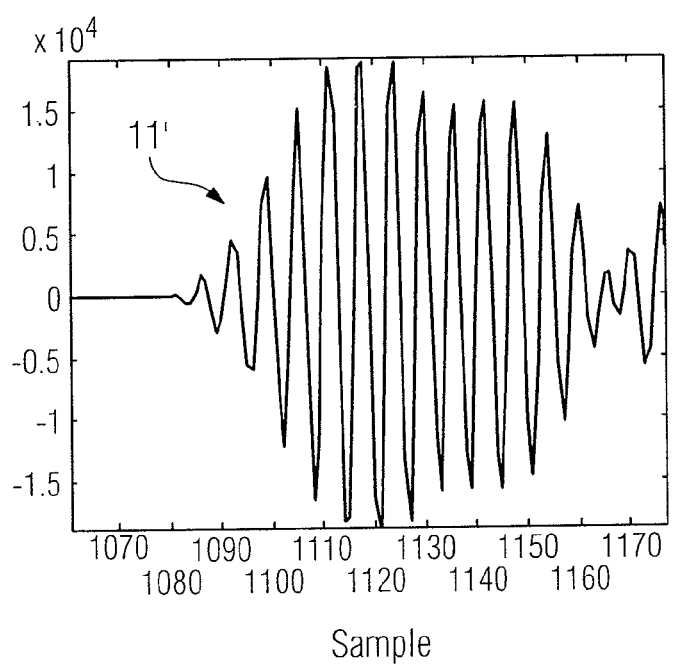
FIG. 2 is a graphical plot of a sampled received echo of an acoustic transmit pulse.

FIG. 2 is an exemplary graphical plot of the sampled received raw echo 11 in a window around a peak value of a sequence of sample values. Here, the values are connected by a continuous polygon line for ease of visibility. The transmit pulse 5 and thus its echo 11 comprise an amplitude modulated carrier having a carrier frequency of, e.g., 44 KHz. The raw echo 11 is sampled at a sampling frequency of, e.g., 325 KHz.

Figure 3:
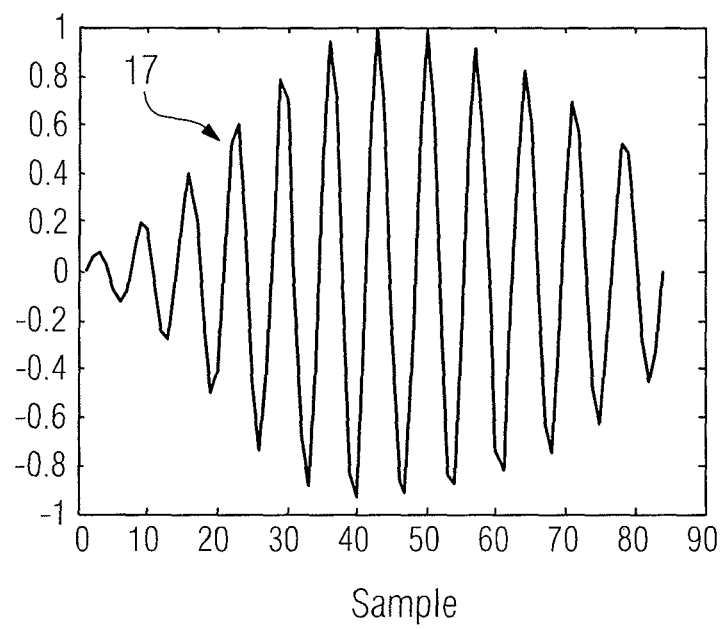
FIG. 3 is a graphical plot of an expected waveform of the sampled received echo of FIG. 2.

FIG. 3 is an exemplary graphical plot of the expected echo shape or waveform 17. Here, the expected echo shape 17 may be equal or similar to the transmit pulse 5, and therefore may be created by the microprocessor 6 that controls the transmit pulse generating transmitter 7. Alternatively, the expected echo shape 17 may be derived and stored from a digitized echo 11" that is received from a reference target 18 (see FIG. 1).

The microprocessor 6 executes software module 15 to calculate the echo distance or time-of-flight by correlating the digitized received echo 11' and the digital expected echo shape 17 and by determining the echo distance from the center of mass of the obtained correlation function. By comparing FIGS. 2 and 3, it is evident that the correlation will be strong for many offsets. Accordingly, the correlation of the two similar amplitude modulated carriers 11' and 17 would result in another similar amplitude modulated signal that is just as complex to evaluate, and would make no difference to using the center of mass of the received echo 11' itself.

In accordance with the disclosed embodiment of the method in accordance with the invention, the obtained correlation values are weighted with coefficients that emphasize the location of a strong correlation. In the present exemplary embodiment, the typical center of mass relationship is modified to include weights $w_k$:

$$\theta = \frac{\sum_{k=0}^{D} kT_S \cdot w_k}{\sum_{k=0}^{D} w_k}, \quad \text{(Eq. 1)}$$

where D is the maximum lag possible (from a reference position), $T_s$ is a sampling interval. Position k is given the importance $w_k$ and the weights $w_k$ are calculated in the correlation domain:

$$w_k = \exp([C(kT_s) - p]/\sigma_D^2), \quad \text{(Eq. 2)}$$

where C(kTs) is the correlation function evaluated at lag $(kT_s)$, where the other parameter comprises design parameters.

The parameter p is merely a normalizing parameter that could be absorbed in the sum of the denominator. Parameter p is nevertheless maintained in the numerator to condition the exponential term (i.e., avoid very large numbers). The variance term is also used to condition the weights $w_k$. With this modified center of mass equation, the weights $w_k$ are exaggerated when the correlation is strong, and smaller weights tend to get reduced to zero (by the exponential).

It should be noted that there are many other relationships that are the inverse of a compression function and progressively weight the correlation values C(kTS), e.g.:

$$w_k = [C(kT_s)]^n, n \geq 2. \quad \text{(Eq. 3)}$$

The calculation of the center of mass equation may be simplified by zeroing all correlation values which are below a threshold.

The method in accordance with the contemplated embodiments of the invention advantageously provides the ability to determine the position of the echo 11 within the resolution of the sampling interval, and takes advantage of the entire data that is available. By nature, the method has a very high level of accuracy, and can estimate the echo distance within a variation of less than ±0.5 sample, which for the above-mentioned sampling frequency of 325 KHz corresponds to 1 mm.

The contemplated method in accordance with the disclosed embodiments requires the knowledge of the transmitted pulse 5 to perform the calculation of the correlation function. Therefore, there is a slight sensitivity to the shape of the pulse, particularly phase or frequency distortion. It is advantageous to interpolate the received sequence to reduce the sensitivity to phase distortion and frequency distortion. The reduction of sensitivity is easily achieved by filtering a padded sequence.

Figure 4:
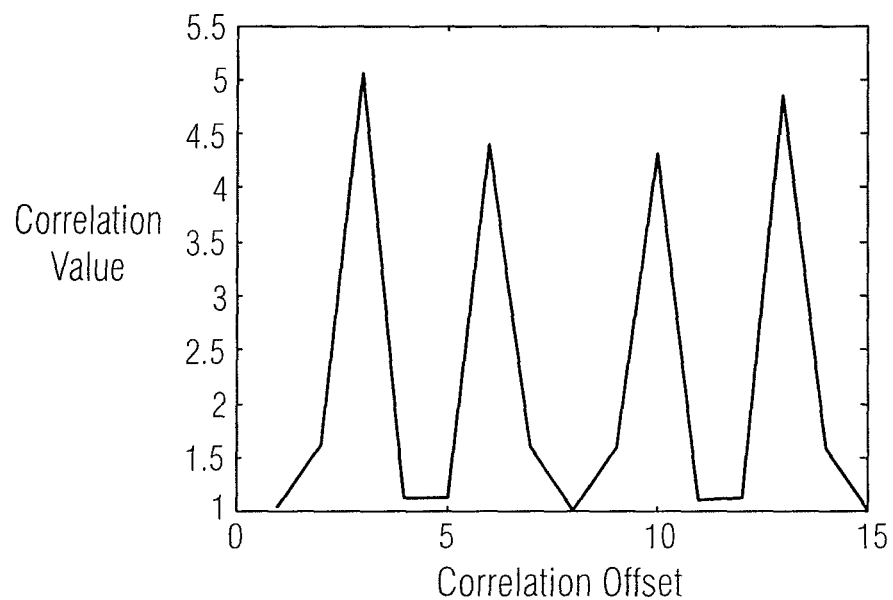
FIG. 4 is a graphical plot of a correlation result from the sampled received echo of FIG. 2 and its expected waveform.

FIG. 4 is a graphical plot of a correlation result from the sampled received echo 11' and its expected waveform 17. Here, the skilled person will appreciate the harmonic behavior of the above-described correlation, where the plot illustrates pulse cycles, similarly to the sampled received echo 11' itself, and the correlation is strong at a multiple of intervals. The center of mass of the correlation result, in this case offset 7, corresponds to the correct echo distance.

Figure 5:
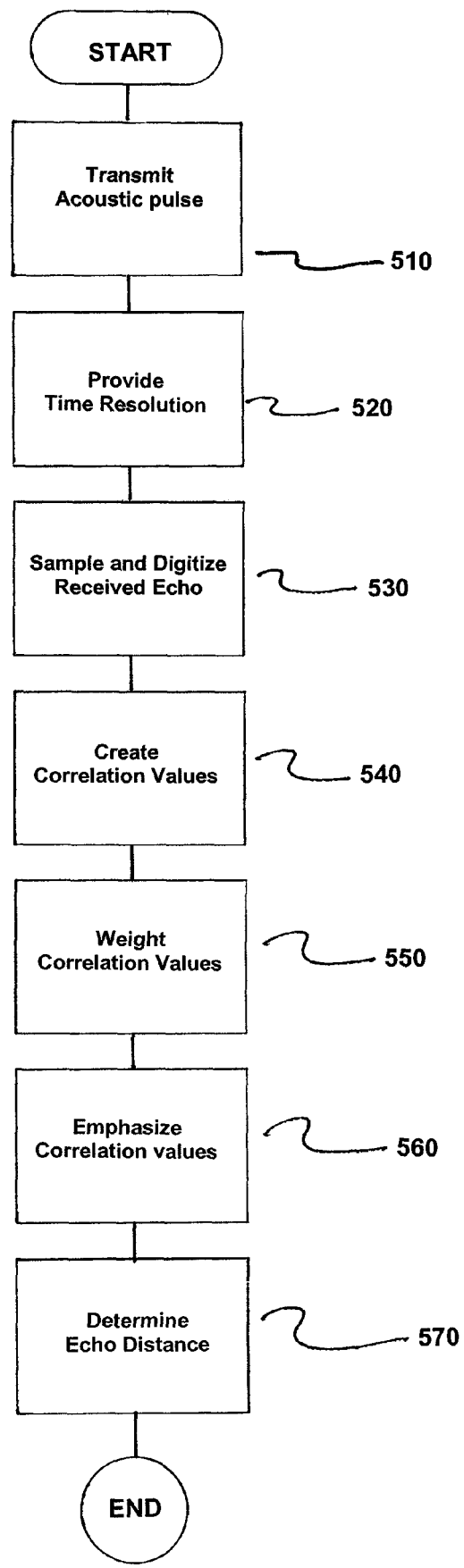
FIG. 5 is a flow chart of the method in accordance with an embodiment of the invention.

FIG. 5 is a flow chart of a method for determining an echo distance in an acoustic pulse-echo ranging system. The method comprises transmitting, from a transducer, an acoustic pulse 5 having a carrier frequency, as indicated in step 510.

A digital expected echo shape 17 is provided with a time resolution higher than the carrier frequency, as indicated in step 520. An echo 11 is received from the transmitted acoustic pulse 5, as indicated in step 530.

The received echo 11 is sampled and digitized at a sampling frequency higher than the carrier frequency, as indicated in step 540.

Correlation values are created from the digitized received echo 11' and the digital expected echo shape 17, as indicated in step 550. The created correlation values are weighted by emphasizing stronger correlation values, as indicated in step 560. The echo distance is determined from a center of mass of the weighted correlation values, as indicated in step 570.

Thus, while there are shown, described and pointed out fundamental novel features of the invention as applied to preferred embodiments thereof, it will be understood that various omissions and substitutions and changes in the form and details of the illustrated method and apparatus, and in their operation, may be made by those skilled in the art without departing from the spirit of the invention. Moreover, it should be recognized that methods and structures shown and/or described in connection with any disclosed form or embodiment of the invention may be incorporated in any other disclosed or described or suggested form or embodiment as a general matter of design choice.

What is claimed is:

1. A method for determining an echo distance in an acoustic pulse-echo ranging system, the method comprising:
   transmitting, from a transducer, an acoustic pulse having a carrier frequency;
   providing a digital expected echo shape with a time resolution higher than the carrier frequency;
   receiving an echo from the transmitted acoustic pulse;

sampling and digitizing the received echo at a sampling frequency higher than the carrier frequency;

creating correlation values from the digitized received echo and the digital expected echo shape;

weighting the created correlation values by emphasizing stronger correlation values; and determining the echo distance from a center of mass of the weighted correlation values.

2. The method according to claim 1, wherein the correlation values are progressively weighted.

3. The method according to claim 1, further comprising:
setting correlation values below a threshold to zero.

4. The method according to claim 2, further comprising:
setting correlation values below a threshold to zero.

5. The method according to claim 1, wherein the digital expected echo shape is directly derived from the transmitted acoustic pulse and stored.

6. The method according to claim 1, wherein the digital expected echo shape is derived from a digitized echo and stored, the digitized echo being received from a reference target.

7. The method according to claim 1, wherein the correlation values are exponentially weighted.

\* \* \* \* \*